United States Patent [19]

Ueeda

[11] 3,906,008

[45] Sept. 16, 1975

[54] METHOD FOR PRODUCING MALEIC ANHYDRIDE

[75] Inventor: Ryuhei Ueeda, Kurashiki, Japan

[73] Assignee: Kuraray Co., Ltd., Kurashiki, Japan

[22] Filed: Oct. 30, 1972

[21] Appl. No.: 301,933

[30] Foreign Application Priority Data

| Nov. 2, 1971 | Japan | 46-88132 |
| Nov. 4, 1971 | Japan | 46-87780 |
| July 21, 1972 | Japan | 47-73548 |
| July 27, 1972 | Japan | 47-75252 |

[52] U.S. Cl.................. 260/346.8 A; 252/435
[51] Int. Cl.$^2$...................... C07D 307/60
[58] Field of Search............ 260/346.8 X

[56] References Cited

UNITED STATES PATENTS

| 2,206,377 | 8/1937 | Weiss | 260/533 |
| 3,156,706 | 10/1973 | Kerr | 260/346.8 |

FOREIGN PATENTS OR APPLICATIONS

| 1,260,597 | 4/1961 | France |
| 1,157,117 | 6/1967 | United Kingdom |

*Primary Examiner*—Harry I. Moatz
*Attorney, Agent, or Firm*—Kaufman & Kramer

[57] ABSTRACT

Maleic anhydride is obtained by oxidizing an unsaturated hydrocarbon having at least four carbon atoms in the presence of a catalyst comprising oxides of phosphorus and tungsten.

10 Claims, No Drawings

METHOD FOR PRODUCING MALEIC ANHYDRIDE

This invention relates to a method for producing maleic anhydride by oxidizing an unsaturated hydrocarbon having at least four carbon atoms or a hydrocarbon mixture containing such unsaturated hydrocarbons with oxygen or a gaseous mixture containing oxygen.

It is well known that maleic anhydride can be produced by oxidizing an unsaturated hydrocarbon having at least 4 carbon atoms in the presence of a catalyst comprising vanadium oxide. However, when vanadium oxide is used as a catalyst, the yield of maleic anhydride is fairly low. In order to improve the yield of maleic anhydride when using a catalyst comprising vanadium oxide, co-catalysts such as molybdenum oxide, tungsten oxide and phosphorus oxide are generally added to the catalyst. For example, a catalyst comprising vanadium pentoxide and oxides of phosphorus and tungsten is described in Japanese Pat. Publication No. 9688/62. In that case, however, the yield of maleic anhydride is still unsatisfactory.

It has now been found in accordance with the present invention that, by using tungsten as a catalyst component and phosphorus as a co-catalyst component, i.e., by using a catalyst system consisting essentially of the oxides of tungsten and phosphorus, it is possible to achieve high yields of maleic anhydrive and to inhibit the formation of by-products such as acetic acid and aldehyde compounds. Surprisingly, it has been found that, when a vanadium compound which is generally used as the catalyst for the production of maleic anhydride is added to the catalyst system comprising oxides of tungsten and phosphorus, the resultant catalytic activity is unexpectedly hindered and the yield of maleic anhydride decreases.

It has now also been found that it is possible to obtain maleic anhydride in high yields and without a decrease in the catalytic activity during the reaction if there is added to the catalyst system consisting essentially of the oxides of tungsten and phosphorus, at least one catalyst promoter selected from the group consisting of alkali metal compounds, alkaline earth metal compounds, copper compounds, zinc compounds, molybdenum compounds, chromium compounds, bismuth compounds and titanium compounds.

It has also been found that it is possible to obtain maleic anhydride in high yields and without a decrease in the catalytic activity during the reaction by introducing a phosphorus compound into the reaction zone.

Catalyst systems comprising oxides of tungsten and phosphorus which are useful in the present invention include (1) mixtures containing an oxide of tungsten and an oxide of phosphorus, (2) complexes or compounds of tungsten, phosphorus and oxygen and (3) mixtures thereof. It is desirable that the atomic ratio of tungsten to phosphorus (W/P) be less than 30, and preferably range from 1 to 18.

In order to prepare the catalysts used in accordance with the present invention, there can be employed (1) a tungsten compound preferably selected from the group consisting of $WO_3$, $H_2WO_4$, $H_4WO_5$, $(NH_4)_2WO_4$, $W_4O_{11}$, $W_{10}O_{29}$, $WCl_6$, $WBr_6$, $WCl_5$, $WBr_5$, metatungstic acid, ammonium metatungstate, ammonium paratungstate, alkali metal tungstate, alkaline earth metal tungstate and the like; (2) a phosphorus compound preferably selected from the group consisting of phosphorus pentoxide, hydrophosphorous acid, phosphorous acid, diphosphorous acid, hypophosphoric acid, orthophosphoric acid, metaphosphoric acid, ultraphosphoric acid, an ammonium salt of phosphorous or phosphoric acid, and the like. There can also be used compounds comprising by nature tungsten and phosphorus such as phosphotungstic acid or a salt thereof.

Catalyst promotoers which can additionally be employed in the catalyst system of the present invention includes compounds such as an alkali metal compound, an alkaline earth metal compound, a copper compound, a zinc compound, a molybdenum compound, a chromium compound, a bismuth compound and a titanium compound.

Typical alkali metal compounds which can be used include the oxides, hydroxides, chlorides, carbonates, sulfates, nitrates, phosphates, acetates, and the like of an alkali metal. When an alkali metal compound is employed in the catalyst of oxides of phosphorus and tungsten, it is desirable that the atomic ratio of the alkali metal to phosphorus (alkali metal/phosphorus) in the catalyst be less than 0.4. When the atomic ratio of an alkali metal to phosphorus is more than 0.4, the initial activity of the catalyst decreases somewhat.

Typical alkaline earth metal compounds which can be used include the oxides, hydroxides, chlorides, carbonates, sulfates, nitrates, phosphates, acetates, and the like of an alkaline earth metal. When the alkaline earth metal compound is employed in the catalyst comprising oxides of phosphorus and tungsten, it is desirable that the atomic ratio of the alkaline earth metal to phosphorus (alkaline earth metal/phosphorus) in the catalyst is in the range of from about 0.001 to 100.

Typical copper compounds which can be used include cupric chloride, cuprous chloride, cupric sulfate, cuprous sulfate, cupric nitrate, cuprous nitrate, and the like. When a copper compound is employed in the catalyst of oxides of phosphorus and tungsten, it is desirable that the atomic ratio of copper to phosphorus (Cu/P) in the catalyst be less than 2.0. When the atomic ratio is more than 2.0, the selectivity for maleic anhydride decreases.

Typical zinc compounds which can be used include zinc oxide, zinc chloride, zinc sulfate, zinc nitrate, and the like, When a zinc compound is employed in the catalyst comprising oxides of phosphorus and tungsten, it is desirable that the atomic ratio of zinc to phosphorus (Zn/P) be less than 1.0. When the atomic ratio is more than 1.0, the conversion of unsaturated hydrocarbons decreases.

Typical molybdenum compounds which can be used include molybdenum sesquioxide, molybdenum trioxide, ammonium molybdate, and the like. When a molybdenum compound is employed in a catalyst of oxides of phosphorus and tungsten, it is desirable that the atomic ratio of molybdenum to phosphorus (Mo/P) be less than 1.0. When the atomic ratio is more than 1.0, the selectivity for maleic anhydride decreases.

Typical chromium compounds which can be used include chromium oxide, chromium chloride, chromium phosphate, chromium sulfate, chromic acid, and the like. When a chromium compound is employed in a catalyst of oxides of phosphorus and tungsten, it is desirable that the atomic ratio of chromium to phosphorus (Cr/P) be less than 1.0. When the atomic ratio is more than 1.0, the selectivity for maleic anhydride decreases.

Typical bismuth compounds which can be used include bismuth nitrate, bismuth oxide, bismuth chloride, bismuth sulfate, and the like.

Typical titanium compounds which can be used include titanium dioxide, titanium nitrate, titanium sulfate, titanium trichloride, titanium teterachloride, and the like.

When the aforementioned metal compounds are used in the form of chlorides or sulfates, chlorine or sulfate residues can remain in the catalyst. However, the presence thereof has no effect on catalytic activity.

In the present invention, phosphorus compounds can be introduced into the reaction zones by the following methods to maintain the high yield of maleic anhydride over extended periods: (1) a method wherein a phosphorus compound is added continuously or intermittently into the gaseous feed mixture, (2) a method wherein a phosphorus compound is introduced into the reaction zone with or without an inert gas such as steam, and (3) a method wherein a phosphorus compound is dissolved in a solvent such as water and is applied to the catalyst comprising oxides of tungsten and phosphorus during or after the reaction.

Typical phosphorus compounds which can be used include phosphine, phosphorus oxide (preferably phosphorus pentoxide), hydrophosphorous acid, phosphorous acid, diphosphorous acid, hypophosphoric acid, orthophosphoric acid, metaphosphoric acid, the salts of phosphorous or phosphoric acid which can be decomposed with heat such as ammonium dihydrogenphosphate, triethyl ammonium phosphate and organophosphorus compound preferably selected from the group consisting of

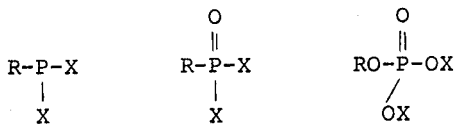

where R is phenyl or a lower alkyl radical and X is hydrogen or R, suitable compounds including for example diethyl phosphine, triethyl phosphine, tripropyl phosphine oxide, triethylphosphate and triphenyl phosphate.

Typical methods for producing the catalyst are described below.

A tungsten compound, for example, is first calcined in an air stream at a temperature of 400°to 1,000°C for 1 to 20 hours to obtain a tungsten oxide. Then, the tungsten oxide is mixed with phosphoric acid diluted with an adequate quantity of water and, if desired, a catalyst promoter as described hereinabove, and then the mixture is heated to obtain a pastelike mixture. By molding the pastelike mixture to a desired size and drying, a catalyst can be obtained. Further, by calcining the thus obtained catalyst at a temperature of 300°C to 800°C, preferably 500°C to 700°C, more stable and active catalysts can be prepared.

The oxides of phosphorus and tungsten and, if desired, a catalyst promoter as described hereinabove, which form the catalysts of the present invention can be supported on a carrier. In such case, supported catalyst systems can be obtained by the following method. After a molded carrier is dipped into an aqueous solution containing a tungsten compound or after a powdered carrier and tungsten are mixed and then molded into a desired size, the molded material is then calcined at an elevated temperature, and then the material is dipped into an aqueous solution containing a phosphorus compound and, if desired, an aqueous solution containing a catalyst promoter as described hereinabove at the same time or separately. The supported catalyst obtained by such a method can be used in situ in the reaction. It can, of course, be used after being calcined. Conventional carriers can be employed such as silica gel, alumina, diatomaceous earth, alundum, carbolundum, calcium sulfate, and the like.

Typical of the unsaturated hydrocarbons containing at least four carbon atoms which can be used as feed materials according to the present invention include, for example, butene-1, butene-2, butadiene, cyclopentadiene, penten-1, $C_4$-fractions obtained by naphtha cracking, and the like. It is possible to use mixtures of unsaturated hydrocarbons and hydrocarbon streams containing such unsaturated hydrocarbons therein in the present invention.

When preparing maleic anhydride, the oxidizing agent employed can be oxygen or a gaseous mixture containing oxygen such as air in admixture with the aforementioned unsaturated hydrocarbon. It is also possible to use, as an oxidizing agent, oxygen mixed with an inert gas such as nitrogen, carbon dioxide, steam, and the like. Furthermore, it is possible to use a dilute oxygen stream such as a portion of a reaction outlet gas stream containing oxygen. The concentration of unsaturated hydrocarbons in a reaction gaseous mixture varies widely according to the species of the unsaturated hydrocarbon and the inert gas used for dilution. Generally, the molar ratio of unsaturated hydrocarbon to oxygen is less than about one-tenth or more than about one-half in order to prevent explosions.

In order to produce maleic anhydride in accordance with the present invention, a catalyst containing oxides of phosphorus and tungsten and, if desired, a catalyst promoter as described hereinabove is packed into a reaction zone, and then a gaseous mixture containing an unsaturated hydrocarbon and oxygen or oxygen-containing gas is introduced into the reaction zone. It is desirable that the gaseous hourly space velocity (S.V.) of the gaseous feed mixture be in the range of from 500 to 15,000 per hour, preferably from 1,500 to 9,000 per hour. It is desirable that the temperature, which is highest in the catalyst layer, range from 250°C to 650°C and preferably from 350°C to 500°C.

In the present invention, the catalyst can be used in the form of a fixed bed, a fluidized bed or a moving bed. It is preferable to use the catalyst in a fluidized bed or a moving bed, because the reaction for producing maleic anhydride is exothermic.

The invention will be described in more detail by the following examples which are intended only to illustrate the invention. Unless otherwise stated, all percentages and parts are by weight. In these example, the terms of conversion, selectivity for maleic anhydride and yield are defined by the following equations:

conversion = $\dfrac{\text{moles of reacted unsaturated hydrocarbon}}{\text{moles of unsaturated hydrocarbon charged to reactor}} \times 100$ selectivity = $\dfrac{\text{moles of maleic anhydride formed}}{\text{moles of unsaturated hydrocarbon reacted}} \times 100$ yield = conversion × selectivity

EXAMPLES 1-8

50 grams of tungstic acid were calcined in an air stream at a temperature of 700°C for 4 hours. 45 grams of the tungsten oxide so formed were mixed with 3.55 grams of phosphoric acid having a purity of 85% and sufficient water to obtain a pastelike mixture. The mixture was subjected to molding, and then the molded mass was dried. In the catalyst which was obtained by the aforementioned procedure, the atomic ratio of phosphorus: tungsten (P:W) was 1:6.3. The catalyst was further calcined in an air stream at a temperature of 500°C for 2 hours before being used in the reaction.

The thus obtained catalyst was packed into a reactor having an inner diameter of 15 millimeters and a length of 60 centimeters, the reactor being equipped with means for heating the reactor. A feed stream comprising air and 1 volume percent of an unsaturated hydrocarbon or mixture thereof as described in Table 1 was introduced into the reactor at a space velocity of 3,000 per hour and at a temperature as described in Table 1. The results are shown in Table 1.

Table 1

| Ex. | Unsaturated Hydrocarbon | Temp. (°C) | Yield of Maleic Anhydride (%) | Yield of Saturated Acid (%) | Conversion of Unsaturated Hydrocarbon (%) |
|---|---|---|---|---|---|
| 1 | butene-1 | 460 | 67 | 2 | 96 |
| 2 | cis-butene-2 | 460 | 66 | 3 | 98 |
| 3 | trans-butene-2 | 460 | 68 | 2 | 95 |
| 4 | butadiene | 460 | 74 | 1 | 100 |
| 5 | cyclopentadiene | 480 | 54 | 2.2 | 95 |
| 6 | pentene-1 | 500 | 41 | 7.2 | 90 |
| 7 | di-cyclopentadiene | 480 | 49 | 3.1 | 90 |
| 8 | Mixture containing 25 weight parts of butane, 48 weight parts of n-butene and 29 weight parts of isobutene | 460 | 35 | 5 | 85 |

EXAMPLE 9

45 grams of tungsten oxide which was manufactured by the same procedure as in Examples 1-8 were mixed with 7.0 grams of phosphoric acid having a purity of 85% and sufficient water to obtain a pastelike mixture and then the mixture was subjected to the same procedure as in Examples 1-8. In the catalyst thus obtained, the atomic ratio of phosphorus: tungsten (P:W) was 1:3.2. The catalyst was further calcined in an air stream at a temperature of 500°C for 2 hours before using it in the reaction.

The thus obtained catalyst was packed in the same reactor as used in Examples 1-8. Maintaining the highest temperature in the catalyst layer at 490°C, air containing one volume percent of butene-1 was introduced into the reactor at a space velocity of 3,000 per hour. As a result, the yields of maleic anhydride and saturated acid were respectively 60% and 1%, and the conversion of butene-1 was 98%.

The deterioration in yield of maleic anhydride during the course of the reaction is shown in Table 2.

Table 2

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 98 | 67 | 22 | 8 | 0 | 1 |
| 15 | 94 | 45 | 33 | 14 | 1 | 1 |
| 60 | 94 | 28 | 42 | 19 | 1 | 4 |

EXAMPLE 10

55 grams of ammonium paratungstate was calcined in an air stream at a temperature of 700°C for 5 hours. 45 grams of the obtained tungsten oxide was mixed with 3.55 grams of phosphoric acid having a purity of 85% and sufficient water to obtain a pastelike mixture. By subjecting the mixture to the same procedures as in Examples 1-8, a catalyst having an atomic ratio of phosphorus: tungsten of 1:6.3 was obtained. The catalyst was further calcined in an air stream at a temperature of 500°C for 2 hours before using it in the reaction.

Using the above catalyst, the same reaction procedures as described in Examples 1-8 were repeated. As a result, yields of maleic anhydride and saturated acid were respectively 54% and 2%, and the conversion of butene-1 was 97%.

EXAMPLE 11

45 grams of tungsten oxide which was obtained by the same method as in Examples 1-8 was mixed with 2.0 grams of ammonium dihydrogenphosphate and sufficient water to obtain a pastelike mixture. By subjecting the mixture to the same procedure as in Examples 1-8, a catalyst having an atomic ratio of phosphorus: tungsten of 1:6.3 was obtained.

Using the catalyst, the same reaction procedures as in Examples 1-8 were repeated. As a result, the yields of maleic anhydride and saturated acid were respectively 62% and 3%, and the conversion of butene-1 was 93%.

EXAMPLE 12

30 grams of tungsten oxide was mixed with 15 grams of fine powdered silica gel calcined at a temperature of 800°C for 2 hours, and then with 2.4 grams of phosphoric acid having a purity of 85% and sufficient water to obtain a pastelike mixture. After being dried at 100°C, the mixture was molded, and then the molded mass was calcined in an air stream at a temperature of 500°C for 2 hours.

The thus obtained catalyst was packed in the same reactor as used in Examples 1-8. Keeping the highest temperature in the catalyst layer at 450°C, air containing one volume percent of butene-1 was introduced into the reactor at a space velocity of 2,400 per hour. As a result, yields of maleic anhydride and saturated acids were respectively 49% and 5%, and the conversion of butene-1 was 96%.

EXAMPLE 13

Phosphorus wolframate ($P_2O_5 \cdot 24WO_3 \cdot nH_2O$) was calcined at a temperature of 700°C for 4 hours, and then crushed. Using the crushed material as a catalyst, the same reaction procedures as in Examples 1–8 were repeated. As a result, yields of maleic anhydride and saturated acids were respectively 45% and 4%, and the conversion of butene-1 was 97%.

COMPARATIVE EXAMPLE 1

Using only powdered tungsten oxide as a catalyst, the same reaction procedures as in Examples 1–8 were repeated. As a result, the yield of maleic anhydride was 4%.

EXAMPLE 14

50 grams of tungstic acid was calcined in an air stream at a temperature of 800°C for 3 hours. 45 grams of the thus obtained tungstic oxide were mixed with an aqueous mixture containing 3.55 grams of phosphoric acid having a purity of 85% and 0.13 gram of lithium chloride to obtain a pastelike mixture. The pastelike mixture was molded, and then dried. The thus obtained catalyst had an atomic ratio of phosphorus: tungsten: lithium (P:W:Li) of 1:6.3:0.1. The catalyst was further calcined in an air stream at a temperature of 500°C for 3 hours before using in reaction.

The catalyst obtained by the aforementioned procedures was packed in the same reactor as used in Examples 1–8. Keeping the highest temperature in the catalyst layer at 460°C, air containing 1 volume percent of butene-1 was introduced into the reactor at a space velocity of 3,000 per hour. The results are shown in Table 3.

Table 3

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 98 | 49 | 32 | 15 | 0 | 2 |
| 15 | 98 | 52 | 31 | 12 | 1 | 2 |
| 60 | 98 | 48 | 32 | 15 | 0 | 3 |

EXAMPLE 15

45 grams of tungsten oxide which were obtained by the same procedures as in Example 14 was mixed with an aqueous mixture containing 3.55 grams of phosphoric acid having a purity of 85% and 0.33 gram of sodium chloride to obtain a pastelike mixture. The pastelike mixture was molded, and then dried. The thus obtained catalyst had an atomic ratio of phosphorus: tungsten: sodium (P:W:Na) of 1:6.3:0.1. The catalyst was further calcined in an air stream at a temperature of 500°C for 3 hours. Using the thus obtained catalyst, the same reaction procedures as in Example 14 were repeated. The results are shown in Table 4.

Table 4

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 94 | 58 | 26 | 9 | 0 | 1 |
| 15 | 90 | 55 | 24 | 9 | 0 | 2 |
| 60 | 91 | 59 | 21 | 8 | 0 | 1 |

EXAMPLE 16

The reaction procedures employed in Example 15 were repeated except that butadiene was used as the unsaturated hydrocarbon feed instead of butene-1. As a result, the yields of maleic anhydride after 3 hours, 15 hours and 50 hours from the start of reaction were 65%, 63% and 61%, respectively.

EXAMPLE 17

45 grams of tungsten oxide produced by the same procedure as in Example 14 was mixed with an aqueous mixture containing 3.55 grams of phosphoric acid having a purity of 85% and 0.2 gram of potassium carbonate to obtain a pastelike mixture. The pastelike mixture was subjected to the same treatments as in Example 14 to produce a catalyst. The catalyst had an atomic ratio of phosphorus: tungsten: potassium (P:W:K) of 1:6.3:0.1. Using the catalyst, the same reaction procedure as in Example 14 was repeated. The deterioration in yield of maleic anhydride with time is shown in Table 5.

Table 5

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 96 | 65 | 21 | 9 | 0 | 1 |
| 15 | 95 | 62 | 20 | 11 | 0 | 2 |
| 60 | 95 | 63 | 20 | 11 | 0 | 1 |

EXAMPLE 18

Using a catalyst which was obtained by the same procedure as in Example 15 except that the amount of sodium chloride employed was changed, the same reaction procedures as in Example 15 were repeated. The results are shown in Table 6.

Table 6

| No. | Na/P (atomic ratio) in the Catalyst | Conversion of Butene-1 (%) | Yield of Maleic Anhydride (%) |
|---|---|---|---|
| 1 | 0.05 | 98 | 54 |
| 2 | 0.10 | 98 | 56 |
| 3 | 0.25 | 85 | 48 |
| 4 | 0.50 | 12 | 4 |
| 5 | 1.00 | 8 | 2 |

When the atomic ratio of alkali metal/phosphorus was more than 0.4, the activity of the catalyst decreased dramatically.

EXAMPLE 19

The same reaction procedures as in Example 15 were repeated except that a gaseous mixture consisting of 25 weight percent of butenes, 48 weight percent of n-butene and 27 weight percent of isobutene was used instead of butene-1. As a result, the yields of maleic anhydride after 3 hours, 15 hours and 50 hours from the start of the reaction were 33%, 35% and 33%, respectively.

EXAMPLE 20

50 grams of tungstic acid was calcined in an air stream at a temperature of 800°C for 3 hours. 45 grams of the obtained tungsten oxide was mixed with an aqueous mixture containing 7.0 grams of phosphoric acid having a purity of 85% and 0.58 gram of anhydrous magnesium chloride to obtain a pastelike mixture and then the pastelike mixture was molded and dried. The atomic ratio of phosphorus: tungsten: magnesium (P:W:Mg) in the thus obtained catalyst was 1:3.2:0.1. The catalyst was further calcined in an air stream at a temperature of 500°C for 2 hours before using in the reaction.

Using the aforementioned catalyst, the same reaction procedures as in Examples 1–8 were repeated. The results are shown in Table 7.

Table 7

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 98 | 51 | 27 | 17 | 1 | 2 |
| 15 | 98 | 52 | 28 | 15 | 1 | 2 |
| 60 | 97 | 49 | 30 | 14 | 1 | 3 |

EXAMPLE 21

45 grams of tungsten oxide which was produced by the same method as in Example 20 was mixed with an aqueous mixture containing 7.0 grams of phosphoric acid having a purity of 85% and 1.5 grams of barium chloride dihydrate to obtain a pastelike mixture. The pastelike mixture was molded, and then dried. The atomic ratio of phosphorus: tungsten: barium (P:W:Ba) in the thus obtained catalyst was 1:3.2:0.1. The catalyst was further calcined in an air stream at a temperature of 500°C for 3 hours before using in the reaction.

Using the catalyst, the same reaction procedures as in Example 20 were repeated. The results are shown in Table 8.

Table 8

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 94 | 54 | 28 | 10 | 0 | 2 |
| 15 | 94 | 48 | 24 | 8 | 1 | 1 |
| 60 | 91 | 48 | 26 | 9 | 0 | 2 |

EXAMPLE 22

45 grams of tungsten oxide which were obtained by the same method as in Example 20 was mixed with an aqueous mixture containing 7.0 grams of phosphoric acid having a purity of 85% and 14.8 % grams of barium chloride dihydrate to obtain a pastelike mixture. The pastelike mixture was molded, and then dried. The atomic ratio of phosphorus: tungsten: barium (P:W:Ba) in the thus obtained catalyst was 1:3.2:1. The catalyst was further calcined in an air stream at a temperature of 500°C for 3 hours before using in the reaction.

Using this catalyst, the same reaction procedures as in Example 20 were repeated. The results are shown in Table 9.

Table 9

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 97 | 52 | 28 | 12 | 0 | 5 |
| 15 | 98 | 56 | 29 | 9 | 1 | 3 |
| 60 | 94 | 55 | 28 | 9 | 0 | 2 |

EXAMPLE 23

Mixtures consisting of 45 grams of tungsten oxide and 7.0 grams of phosphoric acid having a purity of 85% were mixed with calcium sulfate dihydrate in amounts shown in Table 10, and then catalysts were produced from the respective mixtures by the same procedure as in Exanple 20.

Using these catalysts, the same reaction procedures as in Example 20 were repeated. The results are shown in Table 10.

Table 10

| No. | Quantity of Calcium Sulfate Dihydrate (g) | Atomic Ratio of Ca/P | Yield of Maleic Anhydride (%) | | |
|---|---|---|---|---|---|
| | | | After 3 hours | After 30 hours | After 60 hours |
| 1 | 1.0 | 0.1 | 58 | 54 | 57 |
| 2 | 5.2 | 0.5 | 62 | 58 | 59 |
| 3 | 10.4 | 1.0 | 57 | 60 | 54 |
| 4 | 20.8 | 2.0 | 59 | 59 | 54 |

EXAMPLE 24

A catalyst was prepared from 45 grams of tungsten oxide, 7 grams of phosphoric acid having a purity of 85% and 0.7 gram of calcium chloride anhydrate by the same method as in Example 20. The atomic ratio of phosphorus: tungsten: calcium (P:W:Ca) in the catalyst was 1:3.2:0.1. The catalyst was treated with air at a temperature of 500°C for 3 hours before using in the reaction. Using this catalyst, the same reaction procedures as in Example 20 were repeated except that butadiene was used instead of butene-1. The results are shown in Table 11.

Table 11

| Lapse of Time After Start of Reaction (hour) | Conversion of butene-1 (%) | Yield (%) | | | | |
|---|---|---|---|---|---|---|
| | | Maleic Anhydride | Carbon monoxide | Carbon Dioxide | Acetic Acid | Aldehyde Compounds |
| 3 | 99 | 66 | 16 | 11 | 5 | 1 |
| 15 | 99 | 65 | 17 | 12 | 4 | 1 |
| 60 | 100 | 63 | 17 | 14 | 3 | 3 |

EXAMPLE 25

Using the same catalyst as used in Example 24, the same reaction procedures as in Example 20 were repeated except that a mixture consisting of 25 weight percent of butene, 48 weight percent of n-butene and 27 weight percent of isobutene was used instead of butene-1. The yield of maleic anhydride after 3 hours, 15 hours and 60 hours from the start of reaction were 31%, 34% and 34%, respectively.

EXAMPLE 26

45 grams of tungsten oxide, 5 grams of phosphoric acid having a purity of 85%, 1.0 gram of cuprous chloride and a sufficient quantity of water were mixed to obtain a pastelike mixture. The pastelike mixture was molded and dried, and then calcined in an air stream at a temperature of 500°C for 2 hours.

using the aforementioned catalyst, the same reaction procedures as in Examples 1–8 were repeated. The results are shown in Table 12.

Table 12

| Lapse of Time After Start of Reaction (hour) | Conversion of Butene-1 (%) | Yield of Maleic Anhydride (%) |
|---|---|---|
| 3 | 98 | 58 |
| 15 | 98 | 59 |
| 60 | 98 | 60 |

EXAMPLE 27

Catalysts (I)–(V) below were prepared in accordance with the same method as described in Example 26 and 45 grams of tungsten oxide, 7 grams of phosphoric acid having a purity of 85% and a catalyst promoter, each name and the amount of which are shown in Table 13.

Table 13

| Catalyst | Tungsten Oxide (g) | Phosphoric Acid Having a Purity of 85% (g) | Catalyst Promoter (g) |
|---|---|---|---|
| I | 45 | 7 | Zinc chloride 0.8 |
| II | 45 | 7 | Ammonium molybdate 1.1 |
| III | 45 | 7 | Chromium nitrate 2.4 |
| IV | 45 | 7 | Bismuth nitrate 2.9 |
| V | 45 | 7 | Titanium tetrachloride 1.2 |

Using catalysts (I)–(V), the same reaction procedures as in Example 26 were repeated. The results are shown in Table 14.

Table 14

| Catalyst | Conversion of Butene-1 (%) | | | Yield of Maleic Anhydride (%) | | |
|---|---|---|---|---|---|---|
| | After 3 Hours | After 15 Hours | After 60 Hours | After 3 Hours | After 15 Hours | After 60 Hours |
| I | 95 | 94 | 95 | 59 | 57 | 54 |
| II | 99 | 99 | 99 | 58 | 57 | 57 |
| III | 100 | 100 | 100 | 52 | 50 | 51 |
| IV | 91 | 90 | 90 | 54 | 53 | 50 |
| V | 100 | 100 | 100 | 64 | 60 | 64 |

EXAMPLE 28

A catalyst which was prepared from 45 grams of tungsten oxide and 3.55 grams of phosphoric acid having a purity of 85% was packed in a reactor having an inner diameter of 15 millimeters and a length of 600 millimeters. The reactor was equipped with means for heating the reactor and a sprayer adapted to spray phosphoric acid into the reactor. Air containing 1 volume percent of butene-1 was introduced into the reactor at a space velocity of 3,000 per hour, and an aqueous solution containing 10 weight percent of phosphoric acid was sprayed into the reactor at a rate of 2 grams per day. The yield of maleic anhydride after 3 hours, 30 hours and 300 hours was 62%, 62% and 60%, respectively.

EXAMPLE 29

The same reaction procedures as in Example 28 were repeated except that an aqueous solution containing 10 weight percent of triammonium phosphate was used instead of an aqueous solution containing 10 weight percent of phosphoric acid and except that a catalyst prepared from 45 grams of tungsten oxide, 7.0 grams of phosphoric acid having a purity of 85% and 0.8 gram of zinc chloride was used.

The yields of maleic anhydride after 3 hours, 30 hours and 300 hours from the start of reaction were 59%, 63% and 63%, respectively.

What is claimed is:

1. A method for preparing maleic anhydride which comprises oxidizing an olefinic hydrocarbon containing four or five carbon atoms or a hydrocarbon mixture thereof in a reaction zone at a temperature from 250° to 650°C. in the presence of a catalyst consisting of the oxides of tungsten and phosphorus, the atomic ratio of tungsten to phosphorus being less than 30.

2. A method according to claim 1, wherein there is introduced into the reaction zone an additional phosphorus compound selected from the group consisting of phosphine, phosphorus oxides, hydrophosphorous acid, phosphorous acid, diphosphorous acid, hypophosphoric acid, orthophosphoric acid, metaphosphoric acid, salts of phosphorous and phosphoric acid which are decomposed at the reaction temperature, and organophosphorus compounds of the formulae:

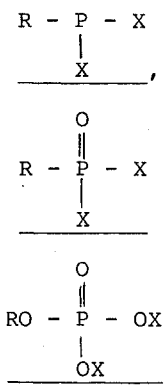

wherein R is phenyl or lower alkyl and X is hydrogen or R.

3. A method according to claim 1 wherein the catalyst is supported on a carrier.

4. A method according to claim 1 wherein the catalyst consists essentially of a complex or a compound of tungsten, phosphorus and oxygen.

5. A method according to claim 1 wherein the catalyst consists essentially of oxides of tungsten and phosphorus, a complex or a compound of tungsten, phosphorus and oxygen, and mixtures thereof.

6. A method according to claim 1 wherein oxidation is effected by admixing said olefinic hydrocarbon with an oxidizing agent comprising oxygen or an oxygen-containing gas.

7. A method according to claim 6 wherein the molar ratio of olefinic hydrocarbon to oxygen is less than one-tenth or more than one-half.

8. A method according to claim 1 wherein the gaseous hourly space velocity through the reaction zone ranges from 500 to 15,000 per hour.

9. A method according to claim 1 in which the olefinic hydrocarbon is selected from the group consisting of butene-1, butene-2, butadiene, cyclopentadiene and pentene-1.

10. A method according to claim 1 in which the olefinic hydrocarbon is the $C_4$ fraction which is obtained by naphtha cracking.

* * * * *

UNITED STATES PATENT OFFICE
CERTIFICATE OF CORRECTION

Patent No. 3,906,008      Dated Sept. 16, 1975

Inventor(s) Ryuhei Ueeda

It is certified that error appears in the above-identified patent and that said Letters Patent are hereby corrected as shown below:

In Column 1, line 27, "anhydrive" should read --anhydride--.
In Column 2, line 7, change "promotoers" to --promoters--.
In Column 4, line 7, change "in situ" to read --in situ--.
In Column 4, line 57, change "example" to read --examples--.
In Column 10, line 7, after "14.8" delete "%".
In Column 10, line 7 and 8 change "barioum" to read --barium--.
In Column 10, line 37, change "Exanple" to read -- Example--.
In Column 11, line 32, change "using" to read --Using--.
In Column 13, line 8, insert --and,-- at the left hand
    margin between the second and third equation.

Signed and Sealed this

Twenty-fourth Day of August 1976

[SEAL]

Attest:

RUTH C. MASON      C. MARSHALL DANN
*Attesting Officer*      *Commissioner of Patents and Trademarks*